(12) United States Patent
Slates

(10) Patent No.: US 6,246,229 B1
(45) Date of Patent: Jun. 12, 2001

(54) METHOD AND APPARATUS FOR CONTROLLING THE TEMPERATURE STABILITY OF AN INDUCTOR USING A MAGNETICALLY COUPLED METALLIC OBJECT

(75) Inventor: Rich Slates, Minden, NV (US)

(73) Assignee: Bently Nevada Corporation, Minden, NV (US)

( * ) Notice: Subject to any disclaimer, the term of this patent is extended or adjusted under 35 U.S.C. 154(b) by 0 days.

(21) Appl. No.: 09/310,841

(22) Filed: May 12, 1999

(51) Int. Cl.$^7$ ........................................................ G01B 7/00
(52) U.S. Cl. ........................ 324/207.12; 324/207.16; 324/207.26; 324/225; 324/236; 336/179
(58) Field of Search .................. 324/207.12, 207.16, 324/207.26, 207.25, 207.24, 225, 234, 236; 336/179; 361/140

(56) References Cited

U.S. PATENT DOCUMENTS

| | | |
|---|---|---|
| 3,471,815 | 10/1969 | Grant et al. . |
| 3,564,392 | 2/1971 | Scully . |
| 3,634,799 | 1/1972 | Strauch . |
| 3,694,785 | 9/1972 | Chass . |
| 3,750,010 | 7/1973 | Abnett et al. . |
| 3,939,403 | 2/1976 | Stassart . |
| 3,992,690 | 11/1976 | Sperr, Jr. . |
| 3,996,510 | 12/1976 | Guichard . |
| 4,109,312 | 8/1978 | Beutel . |
| 4,214,483 | 7/1980 | Young . |
| 4,267,508 | 5/1981 | Ando . |
| 4,598,260 | 7/1986 | Carr . |
| 4,651,094 | 3/1987 | Wallace . |
| 4,652,822 | 3/1987 | Wallace . |
| 4,704,578 | * 11/1987 | Guillaumin .......................... 324/225 |
| 4,857,842 | 8/1989 | Sturman et al. . |
| 4,926,123 | 5/1990 | Redlich . |
| 5,072,180 | 12/1991 | Moreau . |
| 5,089,930 | 2/1992 | Chass . |
| 5,115,193 | 5/1992 | Bean et al. . |
| 5,126,664 | 6/1992 | Howard . |
| 5,270,645 | 12/1993 | Wheeler et al. . |
| 5,274,328 | 12/1993 | Begin et al. . |
| 5,278,523 | 1/1994 | Kriz . |
| 5,332,966 | 7/1994 | Berberich . |
| 5,351,003 | 9/1994 | Bauer et al. . |
| 5,545,983 | 8/1996 | Okeya et al. . |
| 5,574,366 | 11/1996 | Joost . |
| 5,589,768 | 12/1996 | Ishiyama et al. . |
| 5,608,318 | 3/1997 | Yasui . |

* cited by examiner

Primary Examiner—Walter E. Snow
(74) Attorney, Agent, or Firm—Dennis DeBoo

(57) ABSTRACT

A method and apparatus for controlling temperature stability of an inductor by using a magnetically coupled metallic object is disclosed in which a metallic object is magnetically coupled to the inductor by a magnetic field emanating therefrom. In one embodiment, the apparatus is tailored for use in a proximity probe of a machine monitoring system and includes the metallic object magnetically coupled to a sensing coil for controlling a resistance versus temperature profile including compensating for a proximity effect resistance of the coil.

31 Claims, 5 Drawing Sheets

METHOD AND APPARATUS FOR CONTROLLING THE TEMPERATURE STABILITY OF AN INDUCTOR USING A MAGNETICALLY COUPLED METALLIC OBJECT

FIELD OF THE INVENTION

The instant invention relates generally to a method and apparatus for controlling the temperature stability of an inductor or transformer, and in particular, to a method and apparatus for controlling the temperature stability of a sensing coil of a proximity probe using a magnetically coupled metallic object.

BACKGROUND OF THE INVENTION

A variety of devices and methods have been developed in an effort to control the temperature stability of an inductor in a diversity of applications. However, these efforts have not always provided a satisfactory solution to the problem of controlling the temperature stability of an inductor in a multiplicity of these applications. Specifically, there is a temperature stability problem of an inductor employed in a proximity probe utilized for machine monitoring as a result of, inter alia, the severe temperature predations of the environment.

To operate safely and efficiently, rotating and reciprocating machinery require the use of various transducers. One such transducer is an eddy current or proximity probe which may be utilized for, inter alia, monitoring machine vibration characteristics. In this environment the proximity probe must operate under very adverse physical conditions.

Typically, the proximity probe, in conjunction with associated electronics, outputs a signal correlative to a spacing between a target object (e.g., a rotating shaft of a machine or an outer ring of a rolling element bearing) and a sensing coil of the proximity probe. It is critical that the length or spacing between the target and the sensing coil of the proximity probe remains within the linear range of the proximity probe for providing accurate and reliable measurements of machine vibration characteristics. Thus, one distinguishing characteristic for providing accurate and reliable measurement relies on providing a proximity probe which under the predations of its operating environment remains in the linear range of operation.

The electronics associated with the proximity probe typically incorporates some type of oscillation circuit whose amplitude of oscillations is dependent on the conductance of the included sensing coil. When the circuit is oscillating, the sensing coil has an alternating current flowing therein which causes the sensing coil to radiate energy in the form of an alternating magnetic field. The target object absorbs some of the radiated energy from the sensing coil when it is placed within the alternating field emanating from the sensing coil. This absorption of energy is a result of the alternating field generating eddy currents in the object which circulate so as to oppose the alternating field which created them. The amount of energy absorbed by the target object is correlative to the spacing between the target object and the sensing coil. The closer the target is to the sensing coil, the more energy the target will absorb from the sensing coil as a result of the eddy current principle. Therefore, the amplitude of oscillations of the oscillation circuit will vary as a function of spacing between the sensing coil and the target. Thus, this type of proximity probe system is advantageously employed for measurements needed when monitoring certain characteristics of rotating and reciprocating machinery. In these types of environments the proximity probe system must provide accurate and reliable measurements over a wide range of circuit and environmental conditions.

Heretofore, the ability to provide accurate and reliable measurements over a wide range of circuit and environmental conditions has been dependent on, inter alia, the characteristics of the sensing coil including the material and diameter of the wire used to wind the coil, the operating or resonance frequency of the system and the remaining electronics which constitute the proximity probe system. The sensing coil and the remaining electronics usually have a wide range of tolerances, such as gain, bias voltage, bias current and temperature coefficients. Accordingly, each production unit has to be initially calibrated to incorporate those tolerances. Moreover, the sensing coil of the proximity probe usually contains sources of temperature drift error which are attempted to be compensated for in the final product, usually at the expense of additional circuitry.

A principal source of the temperature drift error in the sensing coil is due to a temperature dependent resistance of the coil. This temperature dependent resistance of the sensing coil effects a source of temperature drift error resulting in inaccurate proximity probe measurements as a consequence of the false appearance of a gap change between the target and sensing coil. Such inconsistencies in temperature stability of the proximity probe result in unpredictable and unreliable measurements even when the proximity probe is functioning in its linear range of operation.

For the foregoing reasons, there is a need for controlling the temperature stability of a sensing coil of a proximity probe to preclude temperature drift and the resultant false appearance of gap change which leads to inaccurate and unreliable measurements of machine operating characteristics. In addition, there is a need to solve the general problem of setting the temperature response of resistance of an inductor to a value close to zero and to adjust the temperature coefficient of resistance of an inductor to compensate for anomalous behavior.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
| --- | --- | --- |
| 3,471,815 | October 7, 1969 | Grant, et al. |
| 3,564,392 | February 16, 1971 | Scully |
| 3,634,799 | January 11, 1972 | Strauch |
| 3,694,785 | September 26, 1972 | Chass |
| 3,750,010 | July 31, 1973 | Abnett, et al. |
| 3,939,403 | February 17, 1976 | Stassart |
| 3,992,690 | November 16, 1976 | Sperr, Jr. |
| 3,996,510 | December 7, 1976 | Guichard |
| 4,214,483 | July 29, 1980 | Young |
| 4,267,508 | May 12, 1981 | Ando |
| 4,598,260 | July 1, 1986 | Carr |
| 4,651,094 | March 17, 1987 | Wallace |
| 4,652,822 | March 24, 1987 | Wallace |
| 4,857,842 | August 15, 1989 | Sturman, et al. |
| 4,926,123 | May 15, 1990 | Redlich |
| 5,027,180 | December 10, 1991 | Moreau |
| 5,089,930 | February 18, 1992 | Chass |
| 5,115,193 | May 19, 1992 | Bean, et al. |

-continued

| PATENT NO. | ISSUE DATE | INVENTOR |
|---|---|---|
| 5,126,664 | June 30, 1992 | Howard |
| 5,270,645 | December 14, 1993 | Wheeler, et al. |
| 5,274,328 | December 28, 1993 | Begin, et al. |
| 5,278,523 | November 11, 1994 | Kriz |
| 5,332,966 | July 26, 1994 | Berberich |
| 5,351,003 | September 27, 1994 | Bauer, et al. |
| 5,545,983 | August 13, 1996 | Okeya, et al. |
| 5,574,366 | November 12, 1996 | Joost |
| 5,589,768 | December 31, 1996 | Ishiyama, et al. |
| 5,608,318 | March 4, 1997 | Yasui |

SUMMARY OF THE INVENTION

The instant invention is distinguished over the known prior art in a multiplicity of ways. For example, the instant invention provides a temperature stable inductor including a metallic object magnetically coupled to a coil for setting the coils resistance change with temperature to a value close to zero and/or for controlling the coils temperature coefficient of resistance to compensate for a target object temperature coefficient in, for example, a proximity probe system. Thus, the instant invention solves the problem of the temperature drift error of the coil in a stand alone application and when employed in a proximity probe of the proximity probe system for monitoring, for example, a rotating shaft of a machine or an outer ring of a rolling element bearing for determining machine status. In addition, the instant invention eliminates the need to use a low temperature coefficient of resistance wire which typically has a relatively high resistance value which sacrifices the inductors Q or figure of merit which can be defined mathematically as the reactance of the inductor divided by the total series resistance of the inductor. Therefore, by magnetically coupling the metallic object to the coil wound from a low resistance wire the instant invention solves the problem of how to maintain the temperature stability of the coil without sacrificing the inductors Q. Therefore, the instant invention provides the added advantage of keeping the overall system gain as low as possible while maintaining temperature stability of the coil.

In one preferred form, the instant invention provides a temperature compensated proximity probe including a coil and a metallic object disposed adjacent thereto. The coil and metallic object are preferably enveloped within a common molded encapsulation having a front end and a back end. The encapsulation ensconces the coil proximate the front end and a portion of an electrical conductive medium emanating from the back end, The encapsulation also ensconces the metallic object that is preferably interposed between the coil and the electrical conductive medium. The electrical conductive medium is preferably a multi-axis cable including a center conductor electrically connected to a first lead of the coil and a coaxial conductor electrically connected to a second lead of the coil wherein the center conductor and coaxial conductor are separated by an insulator or dielectric.

In one embodiment, the proximity probe is employed as a resonator for an oscillation circuit and the coil is of an air core type that is employed to sense static and dynamic distances between itself and a target object. The target object is typically monitored for movement. A change in distance between the target object and the coil results in a proportional change in amplitude of oscillations outputted by the oscillation circuit. The change in the amplitude of oscillations can be measured by, for example, a non-loading active peak-to-peak detector circuit which outputs signals to a monitor system which, inter alia, may provide a linear display of the signals.

Inter alia, the instant invention counter balances two factors in determining the coil design for the proximity probe displacement system. First, the temperature stability of the system is partially controlled by the selection of the material and diameter of the wire used to wind the coil and by setting the frequency of the system in which the coil will be employed so that the wire DC resistance will come as close as possible to having a magnitude of change which is substantially equal in magnitude but opposite in direction to the change in the wire proximity effect resistance. The sum of these two resistance terms defines a total series resistance profile of the coil which changes due to temperature as a result of the sum of the wire DC resistance and the wire proximity effect resistance not being substantially equal in magnitude but opposite in direction to one another. Furthermore, in a proximity probe displacement system the series resistance of the coil changes due to temperature and correlative to the gap between the probe and the target object being monitored. Therefore, a change in coil resistance due to temperature appears as a gap change between the target and coil.

Accordingly, this temperature dependent resistance of the sensing coil brings about a source of temperature drift error which results in inaccurate proximity probe measurements as a consequence of the false appearance of a gap change between the target object and coil. Such inconsistencies in temperature stability of the proximity probe result in unpredictable and unreliable measurements even when the proximity probe is functioning in its linear range of operation.

Thus, the instant invention solves the problem of how to maintain the temperature stability of the coil or inductor without sacrificing the important characteristics of the inductor. Specifically, the instant invention solves the problem of, inter alia, the inability to balance the wire DC resistance and the wire proximity effect resistance so that they are substantially equal in magnitude but opposite in direction to one another and the temperature drift error problem of the eddy current proximity probe by magnetically coupling a metallic object to the coil to substantially cancel out any remaining temperature dependent series resistance for effecting a temperature stable proximity probe. The metallic object is magnetically coupled to the coil by the magnetic field radiated from the coil as a result of an alternating current flowing therein. Thus, the temperature stable inductor employed in the proximity probe according to the instant invention maintains an accurate indication of the gap between the target object and the proximity probe under the temperature predations found in the environment of machine monitoring.

OBJECTS OF THE INVENTION

Accordingly, it is an object of the instant invention to provide a new and novel method and apparatus for controlling the temperature stability of an inductor.

A further object of the instant invention is to provide a method and apparatus as characterized above for controlling the temperature stability of an inductor by using a magnetically coupled metallic object.

Another further object of the instant invention is to provide a method and apparatus as characterized above which provides a significant degree of freedom for setting the temperature response of a series resistance of a sensing coil.

Another further object of the instant invention is to provide a method and apparatus as characterized above for providing a temperature stable sensing coil without sacrificing the coil Q.

Another further object of the instant invention is to provide a method and apparatus as characterized above for adjusting a coils resistance change with temperature by using a magnetically coupled metallic object.

Another further object of the instant invention is to provide a method and apparatus as characterized above for adjusting a coils resistance change with temperature to compensate for a target object by using a magnetically coupled metallic object.

Another further object of the instant invention is to provide a method and apparatus as characterized above for controlling the temperature stability of a sensing coil in a proximity probe by using a magnetically coupled metallic object.

Another further object of the instant invention is to provide a method and apparatus as characterized above which eliminates the dependency on the use of low temperature coefficient of resistance ($T_{cr}$) wire to form the sensing coil and thus, the relatively high resistance value typically associated with this wire that sacrifices the coil Q.

Another further objet of the instant invention is to provide a proximity probe as characterized above which provides improved overall system temperature stability.

Another further object of the instant invention is to provide a proximity probe as characterized above which provides a high sensing coil Q and an overall low system gain.

Another further object of the instant invention is to provide a proximity probe that has an improved linear range provided by a substantial reduction in the temperature drift error of the transducer.

Another further object of the instant invention is to provide an eddy current proximity probe that precludes the false appearance of gap movement between the target being monitored and the sensing coil due to temperature.

Another further object of the instant invention is to provide an eddy current proximity probe as characterized above which is capable of being mass produced without appreciable alterations in temperature performance from one proximity probe to the next.

Another further object of the instant invention is to maintain a predetermined linear range capability for each manufactured transducer.

Another further object of the instant invention is to provide a new and novel method and apparatus for controlling the temperature stability of a transformer.

Another further object of the instant invention is to provide a new and novel method and apparatus for controlling the temperature stability of a transformer used to galvanically isolate one circuit from another.

Viewed from a first vantage point, it is an object of the instant invention to provide a temperature stable inductor circuit, comprising in combination: a coil; means for coacting with the coil for radiating a magnetic field from the coil; a metallic object disposed within the radiated magnetic field for modifying a temperature performance of the coil for affecting the temperature stable inductor circuit.

Viewed from a second vantage point, it is an object of the instant invention to provide a temperature stable inductor, comprising in combination: a coil operatively coupled to means for setting up an alternating current in the coil for radiating a magnetic field from the coil; a metallic object disposed within the radiated magnetic field of the coil; the metallic object dimensioned to alter a temperature profile of the coil by solely magnetically coupling to the magnetic field of the coil wherein the temperature profile is modified.

Viewed from a third vantage point, it is an object of the instant invention to provide a temperature stable inductor circuit, comprising in combination: a coil located proximate a target to be monitored; the coil operatively coupled to and coacting with a circuit means for radiating a magnetic field from the coil into the target for generating eddy currents therein; the coil having a resultant temperature dependent series resistance including a proximity effect wire resistance; a metallic object disposed within the radiated magnetic field and dimensioned to substantially cancel out the temperature dependent series resistance including the proximity effect wire resistance for affecting the temperature stable inductor circuit.

Viewed from a fourth vantage point, it is an object of the instant invention to provide a temperature stable proximity probe, comprising in combination: a coil; electrical circuit means for coacting with the coil for radiating a magnetic field from the coil; a metallic object coupled to the coil solely by the magnetic field generated from the coil for modifying a temperature performance of the coil for affecting the temperature stable proximity probe.

Viewed from a fifth vantage point, it is an object of the instant invention to provide a temperature stable proximity probe, comprising in combination: a coil producing a varying magnetic field by carrying an alternating current; means for compensating for a temperature dependent series resistance profile of the coil including a proximity effect wire resistance of the coil; the compensation means coupled to the coil by the magnetic field.

Viewed from a sixth vantage point, it is an object of the instant invention to provide a temperature stable proximity probe, comprising in combination: a magnetic sensing element emanating a varying magnetic field by carrying an alternating current; a metallic object disposed in a juxtapositional relationship with the sensing element: a common enclosure housing both the sensing element and the metallic object; the metallic object magnetically coupled to the coil by the varying magnetic field for modifying a temperature performance of the coil.

Viewed from a seventh vantage point, it is an object of the instant invention to provide a proximity probe operatively coupled to an electronic circuit means for use in monitoring the status of machinery by measuring a gap between the probe and an observed target associated with the machinery, the proximity probe comprising in combination: a coil located proximate the target; the coil operatively coupled to and coacting with the electronic circuit means for radiating a magnetic field from the coil to the target for generating eddy current therein; the coil including a DC wire and a proximity effect wire resistance resulting in a temperature dependent series resistance; a length of metallic material disposed adjacent the coil and solely coupled thereto by the radiated magnetic field; the length of metallic material affecting a temperature stable proximity probe by substantially canceling out the temperature dependent series resistance via the magnetic coupling.

Viewed from an eight vantage point, it is an object of the instant invention to provide a method for controlling the temperature stability of an inductor, the steps including: forming the inductor from a wire material; operating the inductor at a frequency wherein the inductor radiates a varying magnetic field and includes a wire DC resistance and a wire proximity effect resistance summing to a resultant temperature dependent series resistance; magnetically coupling a metallic object within the radiated magnetic field for substantially canceling out the resultant temperature dependent series resistance via the magnetic coupling for affecting a temperature stable inductor.

Viewed from a ninth vantage point, it is an object of the instant invention to provide a temperature stable inductor circuit, comprising in combination: a coil producing a varying magnetic field by carrying an alternating current; means for precluding temperature excursions of the coil; the precluding means coupled to the coil by the magnetic field.

Viewed from a tenth vantage point, it is an object of the instant invention to provide a temperature compensated transformer, comprising in combination: a first coil winding and a second coil winding wound upon a magnetic core material to form a closed magnetic circuit, the first coil winding being connected to an alternating current source and radiating magnetic energy; a metallic object disposed within the radiated magnetic energy of the first coil winding; the metallic object dimensioned to alter a temperature profile of the first coil winding by magnetically coupling with the radiated magnetic energy of the first coil winding for providing the temperature compensated transformer.

These and other objects will be made manifest when considering the following detailed specification when taken in conjunction with the appended drawing figures.

DESCRIPTION OF PREFERRED EMBODIMENTS

Figure 1:
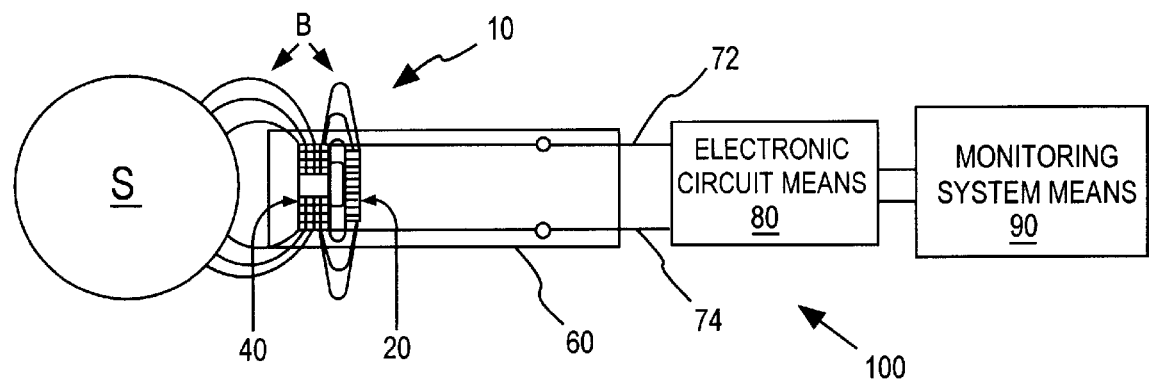
FIG. 1 is a diagrammatical view of a proximity probe according to the instant invention which is juxtaposed to a rotating shaft of a machine for monitoring the vibration thereof and which includes a metallic object magnetically coupled to a coil for controlling the temperature stability thereof

Considering the drawings, wherein like reference numerals denote like parts throughout the various drawing figures, reference numeral 10 is directed to the temperature stable inductor according to the instant invention.

In its essence, and referring to the drawings, the temperature stable inductor 10 includes a metallic object 20 magnetically coupled to a coil or sensing element 40 by a magnetic field B emanating from the coil 40 for controlling the temperature stability profile of the coil.

In one embodiment, and referring to FIG. 1, the temperature stable inductor 10 is tailored for use in a proximity probe 60 of a proximity probe system 100. The proximity probe system 100 monitors a target object, for example, a rotating shaft S of a machine and is comprised of the proximity probe 60 including the temperature stable inductor 10, an electronic circuit means 80 and a monitoring system 90. Typically, the proximity probe 60 is operatively coupled to the electronic circuit means 80 and is disposed adjacent the rotating shaft S of the machine for monitoring the vibrational characteristics thereof In this environment, the proximity probe 60 operates on the eddy current principle and outputs a signal correlative to the spacing between the rotating shaft S and the coil 40 of the probe 60. The temperature stable inductor 10 of the proximity probe 60 includes the metallic object 20 magnetically coupled to the coil 40 for setting the change of the coils DC resistance and Proximity Effect resistance to a value close to zero and for adjusting the coils temperature coefficient of resistance to compensate for the temperature coefficient of the target object being monitored.

Figure 2:
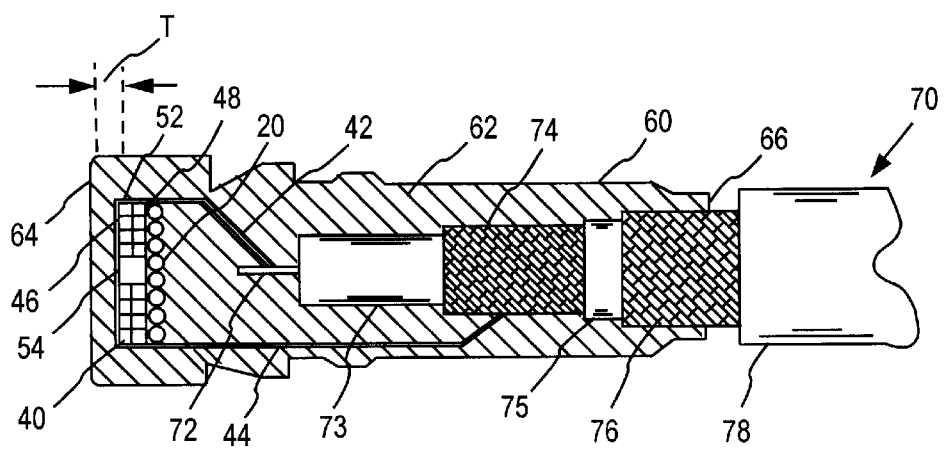
FIG. 2 is a simplified cross-sectional view of the proximity probe shown operatively coupled to information transmitting medium according to the instant invention.

Specifically, and referring to FIGS. 1 and 2, the proximity probe 60 defines a common enclosure housing both the sensing element 40 and the metallic object 20. The proximity probe 60 is preferably formed from a cured monolith of molded material 62 defining an encapsulation having a front end 64 and a back end 66. Typically, the coil 40 is preferably symmetrically disposed within the encapsulation which includes an integrally formed protective wall of uniform thickness T along a forwardmost portion of the coil 40 The encapsulation ensconces the coil 40 and metallic object 20 proximate the front end 64 and preferably also ensconces a portion of an electrical conductive medium 70 that emanates from the back end 66. The metallic object 20 may be of any shape or size and made from any type of metallic material as will be discussed in detail infra. The metallic object 20 is preferably interposed between the coil 40 and the electrical conductive medium 70.

The electrical conductive medium 70 is preferably a multi-axis cable including a center conductor 72 electrically connected to a first lead 42 of the coil 40 and a coaxial conductor 74 electrically connected to a second lead 44 of the coil 40 wherein the center conductor 72 and coaxial conductor 74 are separated by an insulator or dielectric 73. Preferably, a braided sheath 76 circumscribes the coaxial conductor 74 and is separated therefrom by an insulator 75. The braided sheath 76 is used to provide additional shielding and mechanical integrity to the multi-axis cable 70 and is covered by a jacket 78. The electrical conductive medium 70 extends out the back end 66 of the encapsulation 62 and couples the coil 40 to electronic circuit means 80 to provide signal output and power input therebetween.

Figure 3:
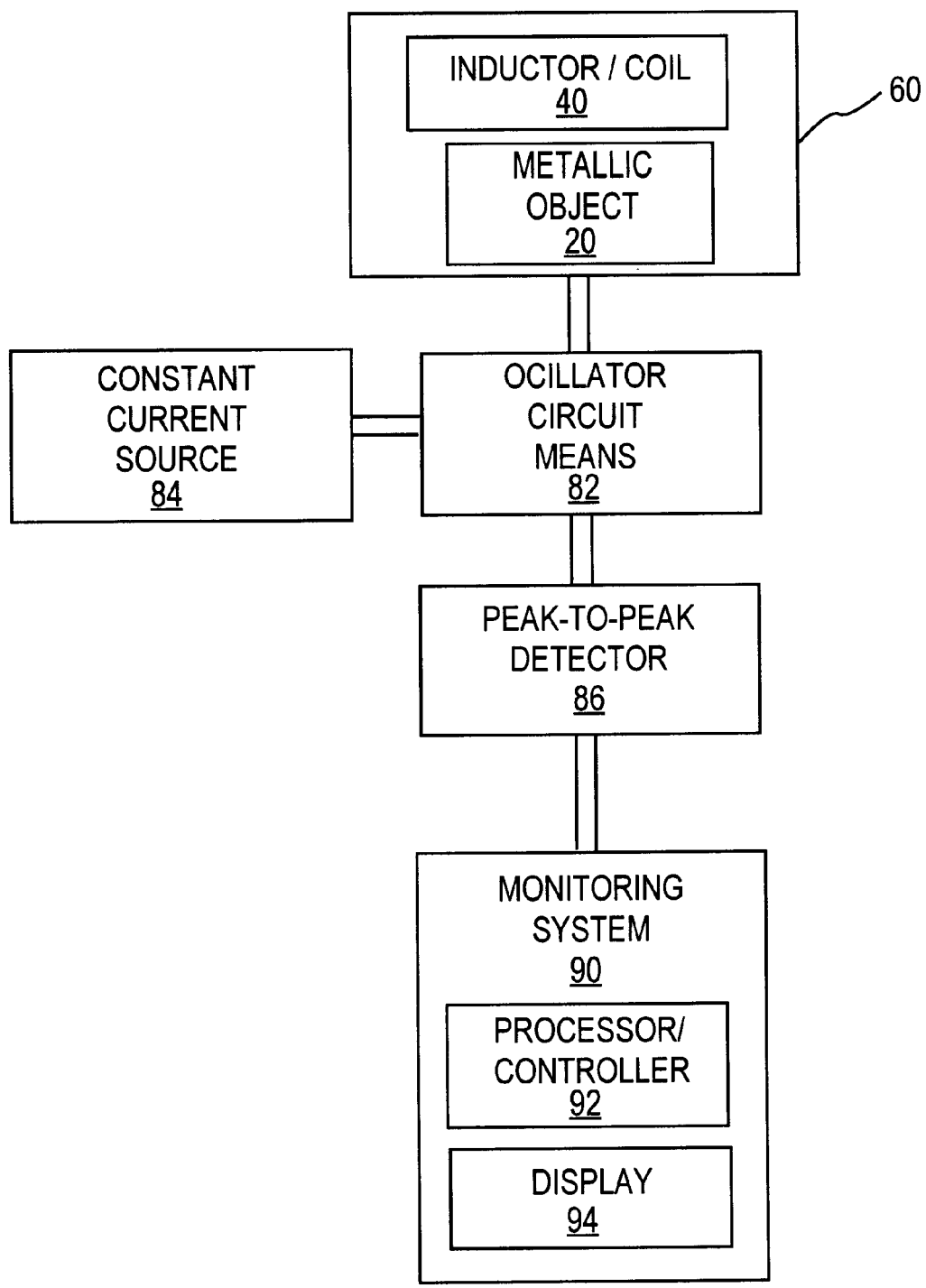
FIG. 3 is a block diagram of the proximity probe and electronic circuitry used for obtaining and displaying signals correlative to machine status.

More specifically, and referring to FIGS. 1 and 3, the coil 40 is used to sense static and dynamic distances between itself and the shaft S by, for example, being employed as a resonator in the electronic circuit means 80. The electronic circuit means 80 may include an oscillation circuit means 82, a constant current source 84 and an active peak-to-peak detector circuit means 86. The cable 70 couples the coil 40 to the oscillation circuit means 82 which in turn is operatively coupled to and driven by the constant current source 84. Thus, the coil 40 functions as a resonator for the oscillation circuit means 82 and a change in distance between the shaft S and the coil 40 results in a proportional change in amplitude of oscillations outputted by the oscillation circuit means 82. The oscillation circuit means 82 is also operatively coupled to the active peak-to-peak detector circuit means 86 and the change in amplitude of oscillations outputted by the oscillation circuit means 82 is measured by the non-loading active peak-to-peak detector circuit means 86. The active peak-to-peak detector circuit means 86 is operatively coupled to the monitoring system 90 and outputs signals correlative to the measured change in the amplitude of oscillations to the monitoring system 90. The monitoring system 90 preferably includes a processor/controller 92 and a display 94 for, inter alia, providing linear display of the output signals correlative to the static and dynamic distances between the coil 40 and the target object or shaft S. Therefore, both the shaft vibration and the average radial position of the shaft may be measured.

The electronic circuit means 80 works in concert with the coil 40 for radiating energy in the form of an alternating magnetic field B (please see FIG. 1) from the coil 40 to the shaft S and for receiving signals from the coil 40. The shaft S absorbs some of this radiated energy and the received signals by the electronic circuit means 80, from the coil 40, are a function of the spacing between the shaft S and the coil 40. Thus, the closer the shaft S is to the coil 40, the more energy the shaft S will absorb as a result of the eddy current principle.

Specifically, the absorption of the radiated energy by the shaft S is a result of the alternating magnetic field B generating eddy currents in the shaft S which circulate so as to oppose the alternating magnetic field B which created them. This action causes the resistance of the coil to change. In addition, the mutual effect of the currents in the closely adjacent conductors, turns of the coil 40, produce a temperature dependent change in resistance in response to the alternating current. Thus, the mutual effect of the currents in the closely adjacent turns of the coil 40 and the effect of the currents in the shaft S produce temperature drift and gain variations in response to the alternating current. Referring to FIG. 1, the metallic object 20 is magnetically coupled to the coil 40 by the radiated magnetic field B and substantially cancels out temperature drift and gain variations produced by both the coil 40 and target object (i.e., the shaft S) for effecting the temperature stable inductor 10 which results in a temperature stable proximity probe 60. Thus, the temperature compensated proximity probe maintains an accurate indication of the gap or spacing between the target object and coil 40 under the temperature predations found in the environment of machine monitoring.

Figure 4:
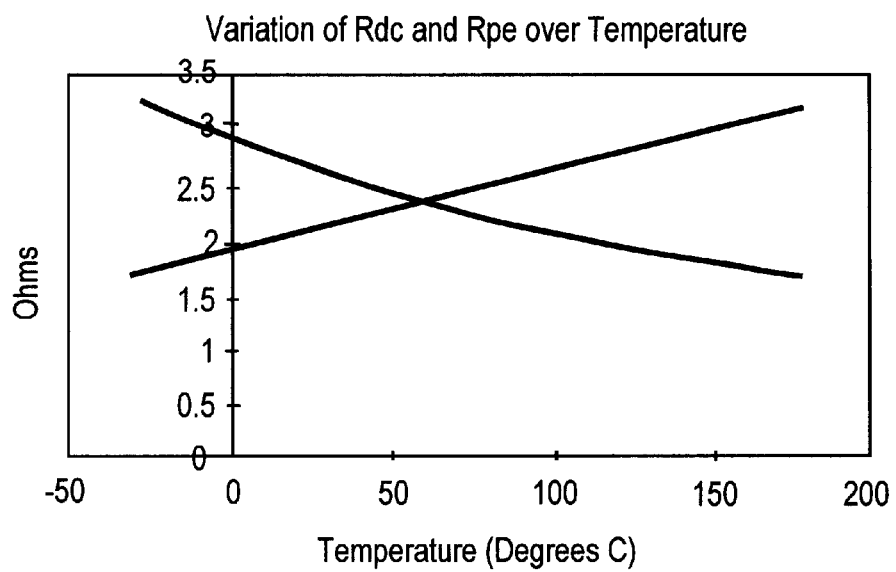
FIG. 4 is a graphical depiction of the variation of wire DC resistance and wire proximity effect resistance over temperature of the wire forming the coil.

Referring to FIGS. 1 and 4, the coil 40 of the proximity probe system 100 is designed according to the instant invention to, inter alia, counter balance two factors. First, the temperature stability of the coil 40 is partially controlled by the selection of the coil's wire material and its diameter and also by setting the frequency at which the system 100 operates so that the wire DC resistance will have a magnitude of change which is substantially equal in magnitude but opposite in direction to the change in the wire proximity effect resistance, FIG. 4 shows a graph of how the wire DC resistance ($R_{DC}$) 106 and the proximity effect resistance ($R_{PE}$) 108 vary over temperature. The sum of these two resistance terms defines the total series resistance of the coil 40.

In addition, the series resistance of the coil 40 of the proximity probe also changes correlative to the gap between the probe 60 and the target object being monitored. For example, at the end of a proximity probes linear range, this resistance term may be in the 0.010 to 0.050 ohms per mil range for a typical 8 mm coil proximity probe displacement system. Therefore, the end result is that for every 0.050 ohm change in coil resistance due to temperature, it appears that the gap moved by 1 mil. Accordingly, this temperature dependent resistance of the coil 40 effects a source of temperature drift error which results in inaccurate proximity probe measurements as a consequence of the false appearance of a gap change between the target object, for example the shaft S, and coil 40. Such inconsistencies in temperature stability of the proximity probe result in unpredictable and unreliable measurements even when the proximity probe is functioning in its linear range of operation. Thus, one hallmark of the instant invention is that it solves the problem of, inter alia, the temperature drift error of eddy current proximity probes.

As mentioned, the DC and proximity effect resistances are usually set to cancel themselves out as much as possible and this is shown in FIG. 4. For example, the equation that governs this relationship for round conductors is shown below. However, the instant invention is applicable to magnetically coupled metallic objects of arbitrary shape as will now be evident to those having ordinary skill in the art, informed by the present disclosure.

The Proximity Effect Resistance (R)=(Proximity Effect Power Loss (P))/($I^2$) Where:

The Proximity Effect Power loss of a Cylinder is given by the following equation:

$$\frac{8\pi w \mu a^2 B^2 [ber_0(x)bei_2(x) - bei_0(x)ber_2(x)]}{[(\mu + \mu_V)ber_0(x) + (\mu - \mu_V)ber_2(x)]^2 + [(\mu + \mu_V)bei_0(x) + (\mu - \mu_V)bei_2(x)]^2}$$

w=radian frequency(rad/second)

$\mu$=permeability of free space=$(4\pi)(10^{-7})$ $\mu_v$=Permeability of the cylindrical wire a=wire radius (meters)

x=a$\sqrt{p}$ p=$\gamma\mu w$ $\gamma$=Conductivity(mhos/meter)=601526000/($\Omega$-cir-mil-ft)

Figure 9:
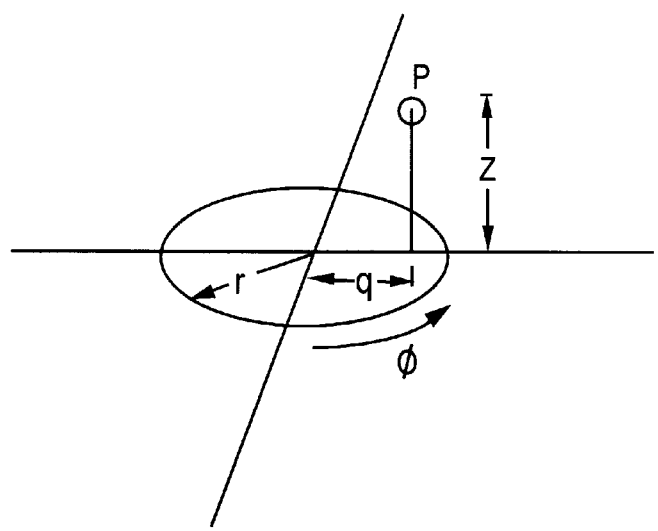
FIG. 9 is a graphical depiction of an elliptical function for diagrammatical defining nomenclature as used in equations found infra.

$ber_0$, $bei_0$, $ber_2$ and $bei_2$ are standard ways of designating Bessel functions as is known to those having ordinary skill in the art B=Magnetic Flux Density=$\sqrt{\Sigma B^{q_2} + \Sigma B^{z_2} + \Sigma B^{\Phi_2}}$ In the case of a coil with circular windings, the flux density from one turn in the coil may be calculated using the following (please also see FIG. 9):

$$B_q = \frac{\mu I}{2\pi} \frac{z}{q\sqrt{(r+q)^2 + z^2}} \left[ -K(m) + \frac{r^2 + q^2 + z^2}{(r-q)^2 + z^2} E(m) \right]$$

$$B_z = \frac{\mu I}{2\pi} \frac{1}{\sqrt{(r+q)^2 + z^2}} \left[ K(m) + \frac{r^2 - q^2 - z^2}{(r-q)^2 + z^2} E(m) \right]$$

$B_\Phi$=0

E and K are Elliptical functions as known to those having ordinary skill in the art, and Where:

$$m = \frac{1 - \sqrt{1-n^2}}{1 + \sqrt{1-n^2}}$$

and $$n^2 = \frac{4rq}{(r+q)^2 + z^2}$$

It is not intuitively obvious looking at these equations, but the shape of the proximity effect resistance will cause the total series resistance to be concave upwards when it is balanced against the DC resistance and the value of the x (wire diameter divided by skin depth) is less than about 2.6. When the quotient of the wire diameter and skin depth is greater than 2.6 the result in the total series resistance curve is concave downward.

Figure 5:
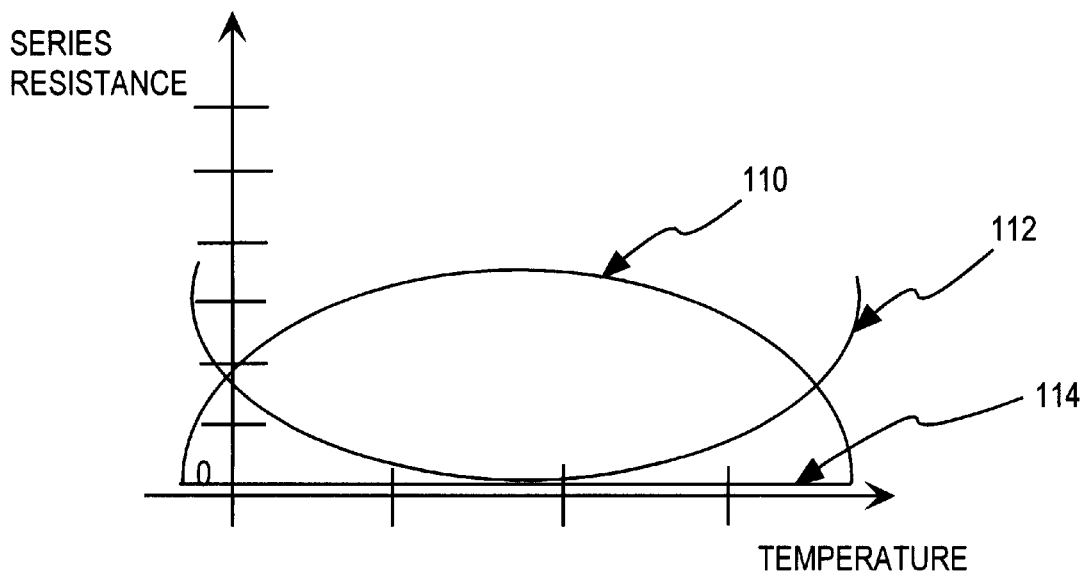
FIG. 5 is a graphical depiction of a total resistance obtained by adding the wire DC resistance and the wire proximity resistance of the wire forming the coil, the proximity effect resistance of the magnetically coupled metallic object and the resistance of the coil compensated with the metallic object.

For purpose of illustration, FIG. 5 shows a simplified concave upward curve 110 exemplary in shape of the total series resistance as it appears when the proximity effect resistance is balanced against the DC resistance. In addition, FIG. 5 shows a simplified concave downwards curve 112 exemplary in shape of the resistance versus temperature response of the metallic object used to balance out the curve 110 which results in a series resistance curve 114 which approaches or reaches zero. The dimensions and material of the metallic object are selected so it most closely compensates the sensing coil 40 and can be determined by empirical methods, numerical methods or a combination of methods thereof as will now be evident to those having ordinary skill in the art, informed by the instant disclosure.

In one embodiment, and referring to FIGS. 2 and 5, the metallic object is placed immediately behind the coil 40 to modify the temperature performance to an empirically or numerically predetermined value. The metallic object is in the form of, for example, an additional length of coiled wire wherein its diameter and conductivity is set to balance out the parabola or other curve which remains in the temperature response or profile after balancing both the DC resistance and the proximity effect resistance. The diameter and material for the compensation wire is selected so it most closely compensates the coil 40 and is preferably determined using numerical techniques. For example, the metallic object may take the form of a helicoid coil made out of a wire having a diameter greater than the diameter of the wire forming the inductor and having enough turns so that when placed immediately adjacent the coil 40, the helicoid coil provides the compensation resistance. The metallic object is coupled to the inductor by a magnetic field generated in the coil 40 and is not part of the circuit. Thus, it is possible to set the conductivity of the coil to balance out a resultant parabola which remains in the temperature response after balancing the wire DC resistance ($R_{DC}$) and the proximity effect resistance ($R_{PE}$).

Figure 6:
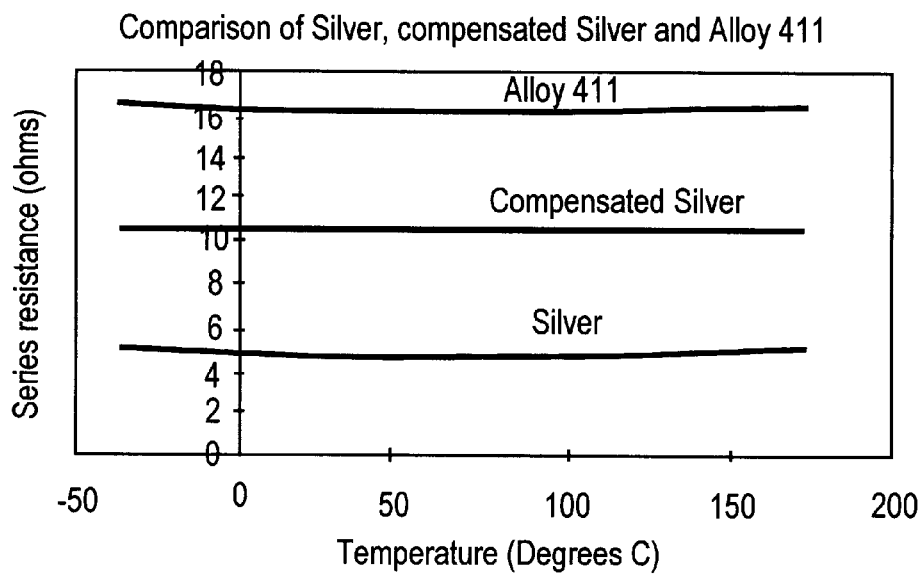
FIG. 6 is a graphical depiction of the total series resistance of an 8 mm coil wound from alloy "411", an 8mm coil wound from silver wire and an 8 mm coil wound from silver wire and compensated with a metallic object.
Figure 7:
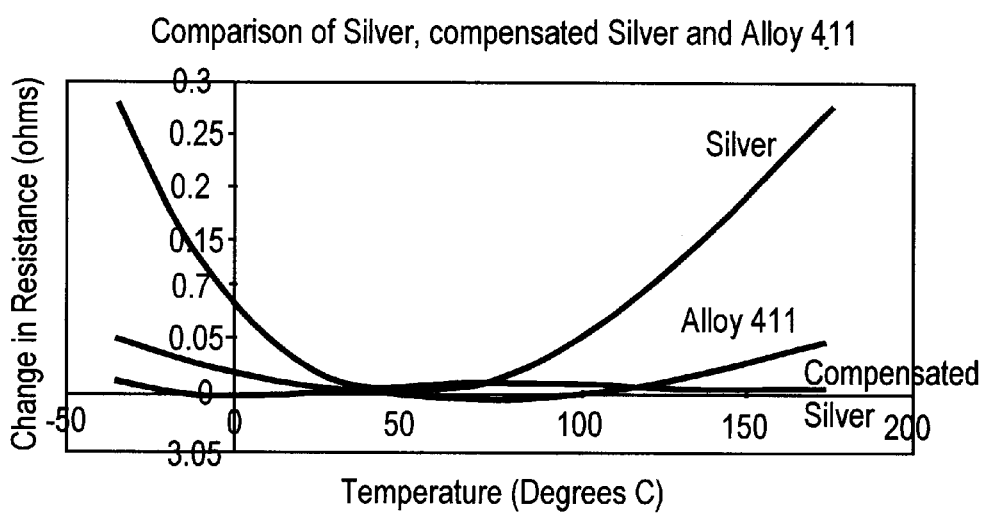
FIG. 7 is a graphical depiction of the total change in series resistance for each design shown in FIG. 6.

By way of example, and referring to FIGS. 6 and 7, an eight millimeter coil is wound from alloy "411", silver wire and a compensated silver wire. The compensated silver wire coil is of like design as the silver wire coil with the exception that the compensated silver wire coil includes an additional compensation coil (metallic object 40) which was added to reduce the size of the temperature response parabola. The compensation coil is formed from a short length of silver wire with a diameter of approximately 17 mils. In each case, 130 turns of 4.7 mil diameter wire is used in the sensing coil 40.

FIG. 6 shows the total series resistance of each coil versus temperature and as can be seen, the deviation is difficult to see once the temperature stable operating point has been selected. FIG. 6 also gives an indicator of the system gain for each design correlative to series resistance. The higher the series resistance, the higher the gain.

FIG. 7 shows a graph of the total change in series resistance for each of the above identified designs. Note that the compensated silver coil is over four times more stable than the alloy "411" coil. The equivalent temperature stability using conventional techniques would require copper alloy "180" and would result in a coil with a series resistance roughly four times that of alloy "411", thereby giving the proximity probe system a poor Q and an even higher gain.

As will now be evident by the instant disclosure, another benefit of the method and apparatus of the instant invention is that is does not depend on the use of low temperature coefficient of resistance wire which typically has a relatively high resistance value which sacrifices the inductors Q. Therefore, by magnetically coupling the metallic object 20 to the coil 40 wound from a low resistance wire the instant invention solves the problem of how to maintain the temperature stability of the coil without sacrificing the inductors Q. Therefore, the instant invention provides a temperature stable proximity probe wherein a low resistance wire can be used to wind the coil thus providing the advantage of keeping the overall system gain as low as possible while maintaining temperature stability of the coil.

Another way of looking at this is that the use of a low temperature coefficient of resistance wire (neutroloy, alloy "180", alloy "90", alloy "60", etc.) reduces the temperature drift error at the expense of increasing the coil resistance. It is easier to see a 0.050 ohm change due to gap when the total resistance is 5 ohms than when the total resistance is 15 ohms. Just like it takes less effort for you to hear a whisper in a quiet room compared to a room with a loud stereo, it takes the electronic circuit means less effort (lower gain) to operate in the system with lower total series resistance. The use of low resistivity wire (a high temperature coefficient of resistance) reduces system gain by allowing a lower total series resistance to be in the system, but it sacrifices temperature stability. This is another way of saying that a higher Q system (lower total series resistance) requires a detector with a lower dynamic range which is easier to build and design.

Figure 8:
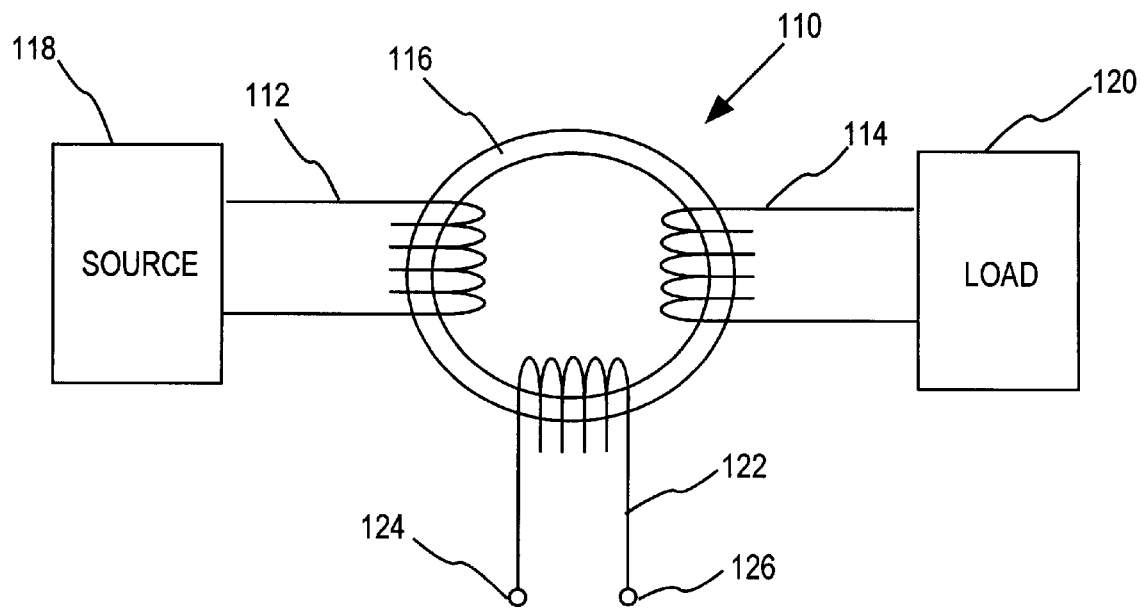
FIG. 8 is a diagrammatical view of a transformer according to the instant invention.

Referring to FIG. 8, the instant invention also provides a method and apparatus for controlling the temperature stability of a transformer 110. The transformer 110 includes two coils of wire 112, 114 wound upon the same magnetic core material 116, which forms a closed magnetic circuit. The magnetic core material 116 is used to increase the magnetic flux and to provide a medium in which the flux through one coil passes through the other coil. Typically, the coil to which power is applied to by a source 118 is called the primary and the coil from which power is taken by a load 120 is called the secondary.

In an ideal transformer, there are no losses in the transformer itself One hundred percent of the energy that goes into the transformer will come out the other side. In a real transformer, there are core losses due to magnetic energy interacting in the magnetic core material and copper losses in the primary and secondary coil windings due to current in the coil wires interacting with the resistance of the wires.

Each coil wire resistance is a combination of a wire DC resistance or bulk resistance, a skin effect resistance, which is usually negligible, and a proximity effect resistance. The proximity effect resistance is due to the magnetic field interacting with the coil wire and is function of frequency, wire diameter, wire conductivity and magnetic flux density at the wire location. Note that the proximity effect resistance of a coil has been delineated in detail hereinabove.

In the ideal transformer, the magnetic flux density at the wire location would be zero because all the magnetic energy is stored in the magnetic transformer core. This is never the case and there is a significant amount of stray magnetic energy available to cause proximity effect resistance.

The total losses in the transformer will be a function of the losses discussed supra. By -understanding the relationship of wire diameter, conductivity and frequency we can change the response of the copper losses to temperature. We do this by changing the wire diameter and/or wire material of one or more of the transformer windings. We could also change the transformer operating frequency. This enables us to change the overall temperature response of the system. We can estimate the magnetic field intensity via analysis or measurement and then change the wire diameter, conductivity or frequency to the desired value.

In one preferred form, the instant invention adds an additional winding of wire 122 of a desired material and diameter to set the overall system temperature response. It is not necessary for this additional winding to be tied into the circuit and preferably, the ends 124, 126 of additional winding of wire 122 are left open to minimize the system energy losses. The mere existence of this additional winding of wire 122 in the magnetic field is enough to cause copper losses, which provide temperature compensation of the transformer to set the overall system temperature response. This also eases the transformer design, because temperature compensation can be finalized later. The instant invention can provide a temperature compensated transformer used to galvanically isolate one circuit from another as will be delineated infra.

In use and operation, and referring to FIGS. 1 and 2, the temperature stable inductor 10 includes the metallic object 20 magnetically coupled to the coil 40 by the magnetic field B emanating from the coil 40 for controlling deviations of resistance of the coil due to temperature for compensating for a temperature instability profile of the coil 40. The coil 40 is preferably implemented as air core coil 40 including a front face 46, a back face 48 and a body 50 having an outer exterior surface 52 and a hollow interior or center void 54 extending therethrough. One preferred way to implement the temperature stable inductor is to make the metallic object 20 in the form of a helicoid coil (i.e., having the form of a flat coil, pancake like, or flattened spiral) wound from a wire having a larger diameter than the wire forming the coil 40 and including enough turns so that when placed immediately behind the sensing coil 40, it provides the compensation resistance. This arrangement provides tight control over the distance between the sensing coil 40 and the compensation coil (metallic object 20) and thus, reduces manufacturing variations. Thus, the instant invention provides a proximity probe with an increase in temperature stability and an overall reduced system gain. In addition, the change in temperature performance from one manufacture unit to another will be operating on a much smaller final value.

The temperature stable inductor 10 is tailored for use in the proximity probe 60 of a proximity probe system 100 for providing accurate and reliable measurements of machine vibration characteristics by monitoring a target, for example, a rotating shaft of a machine or an outer ring of a rolling element bearing supporting a rotating member. Preferably, the windings of the coil 40 lie substantially parallel to the surface of the target being monitored and the axis (centerline) of the probe 60 and coil 40 are substantially perpendicular to the target surface. The coil 40 of the proximity probe 60 is operatively coupled to the electronic circuit means 80 to receive power input therefrom and deliver output signals thereto which are correlative to the static and dynamic distances between the coil 40 and the target object being monitored.

The electronic circuit means 80 is operatively couple to the monitoring system 90 and delivers processed output signals correlative to the static and dynamic distances between the coil 40 and the target object to the monitoring system 90. The monitoring system 90 preferably provides, inter alia, a linear display of processed output signals. The electronic circuit means 80 and the monitoring system means 90 can be implemented by, for example, a "Proximitor® Sensor" and a 3300 Monitoring System respectively, both manufactured by Bently Nevada located in Minden, Nev.

Furthermore, the temperature stable inductor 10 is applicable to, inter alia, the design of stable LC oscillator references; temperature stable inductors for analog circuit design; temperature stable transformers used for galvanic isolation in sensitive circuits; temperature stable eddy current probes used for NDE and temperature stable eddy current switches.

Very stable clock references are often done using oven controlled crystals or precision LC oscillators. The technique of the instant invention would reduce the temperature coefficient of the inductor.

As mentioned supra, the instant invention can provide a temperature compensated transformer used to galvanically isolate one circuit from another. Galvanic isolation is a requirement in many hazardous area applications to limit the amount of energy that can be sent from a side of a circuit in an environment void of explosive gasses (a safe circuit side or safe area) to a side of the circuit in an environment where explosive gasses may exist (a hazardous circuit side or hazardous area). Limiting the energy from the safe circuit side to the hazardous circuit side helps ensure that there is insufficient energy available to cause a spark that may engender an explosion. This is a requirement for equipment installation in many locations.

For example, in many eddy current displacement sensor or proximity probe applications the electronic circuit means 80 (please see FIG. 1) is located in a safe area such as an explosion proof housing. An extension cable is threaded through a seal in the housing so that only the probe end of the extension cable and the extension cable are exposed to the hazardous area where explosive gasses may exist. Current technology forces the use of expensive barriers between the monitor 90 and the circuit means 80 to limit the energy available to go down the extension cable into the hazardous area. The instant invention advances the current technology and eliminates the use of expensive barriers by, inter alia, providing the temperature stable isolation transformer 110 and interposing same between the extension cable and the circuit means 80 in order to limit the energy available to go down the extension cable into the hazardous area.

In addition to limiting the energy transfer, the isolation transformer 110 according to the instant invention can prevent ground loops from interfering with signals. In some sensors, it is common to get ground loops between the outer braid of the cable and the circuit means/monitor common. This problem can be reduced by the use of a cable that includes an additional braided conductor in the cable that is electrically isolated from the circuit. However, when this type of cable is not employed the isolation transformer 110 according to the instant invention can substantially eliminate this problem.

The method and apparatus for controlling the temperature stability of a transformer according to the instant invention is also applicable to power supply design. For example, if one wanted to make a thermally regulated transformer, one could use the present disclosure to design a system so that as the transformer temperature deviated from the designed operating point, the resistance of the wire could be made to go up or down (depending on the design) to drive the system back to the desired operating point.

Additionally, in the case of temperature stable transformers, the metallic object may be the secondary winding of the transformer such that the wire DC resistance ($R_{DC}$) and the proximity effect resistance ($R_{PE}$). terms in each winding cancels out the other. The diameter and the material of the wire forming the coil or the secondary of the transformer is selected so that it closely compensates the secondary and may be determined using numerical techniques as will now be evident to those having ordinary skill in the art, informed by the instant disclosure.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A temperature stable inductor circuit, comprising in combination:
   a coil;
   means for coacting with said coil for radiating a magnetic field from said coil;
   a metallic object disposed within said radiated magnetic field for modifying a temperature performance of said coil for affecting said temperature stable inductor circuit;
   wherein said coil includes a plurality of windings of conductive wire having a first diameter and said metallic object includes a length of conductive wire having a second diameter different than said first diameter of said conductive wire of said coil.

2. The temperature stable inductor circuit of claim 1 wherein metallic object modifies said temperature performance of said coil by modifying a resistance versus temperature profile of said coil.

3. The temperature stable inductor circuit of claim 2 wherein said resistance versus temperature profile of said coil includes a DC wire resistance and a proximity effect wire resistance resulting in a temperature dependent series wire resistance of said coil.

4. The temperature stable inductor circuit of claim 3 wherein said metallic object is dimensioned to substantially cancel out said temperature dependent series wire resistance of said coil for affecting said temperature stable inductor circuit.

5. The temperature stable inductor circuit of claim 4 wherein said coacting means includes means for setting up an alternating current in said coil for radiating said magnetic field from said coil.

6. A temperature stable inductor circuit, comprising in combination:
   a coil;
   means for coacting with said coil for radiating a magnetic field from said coil;
   a metallic object disposed within said radiated magnetic field for modifying a temperature performance of said coil for affecting said temperature stable inductor circuit;
   wherein said coil includes a plurality of windings of conductive wire having a first diameter and said metallic object includes a length of conductive wire having a second diameter equal to said first diameter of said conductive wire of said coil.

7. A temperature stable inductor, comprising in combination:
   a coil operatively coupled to means for setting up an alternating current in said coil for radiating a magnetic field from said coil;
   a metallic object disposed within said radiated magnetic field of said coil;
   said metallic object dimensioned to alter a temperature profile of said coil by solely magnetically coupling to the magnetic field of said coil wherein the temperature profile is modified;
   wherein said coil includes a plurality of windings of conductive wire having a first diameter and said metallic object includes a length of conductive wire having a second diameter different than said first diameter of said conductive wire of said coil.

8. The temperature stable inductor circuit of claim 7 wherein said metallic object modifies said temperature profile of said coil by modifying a resistance versus temperature function of said coil.

9. The temperature stable inductor circuit of claim 8 wherein said resistance versus temperature function of said coil includes a DC wire resistance and a proximity effect wire resistance resulting in a temperature dependent series wire resistance of said coil.

10. The temperature stable inductor circuit of claim 9 wherein said metallic object is dimensioned to substantially cancel out said temperature dependent series wire resistance of said coil for affecting said temperature stable inductor circuit.

11. A temperature stable inductor circuit, comprising in combination:
    a coil operatively coupled to means for setting up an alternating current in said coil for radiating a magnetic field from said coil;
    a metallic object disposed within said radiated magnetic field of said coil;
    said metallic object dimensioned to alter a temperature profile of said coil by solely magnetically coupling to the magnetic field of said coil wherein the temperature profile is modified;
    wherein said coil includes a plurality of windings of conductive wire having a first diameter and said metallic object includes a length of conductive wire having a second diameter equal to said first diameter of said conductive wire of said coil.

12. A temperature stable inductor circuit, comprising in combination:
    a coil located proximate a target to be monitored;
    said coil operatively coupled to and coacting with a circuit means for radiating a magnetic field from the coil into the target for generating eddy currents therein;
    said coil having a resultant temperature dependent series resistance including a proximity effect wire resistance;
    a metallic object disposed within said radiated magnetic field and dimensioned to substantially cancel out said temperature dependent series resistance including said proximity effect wire resistance for affecting said temperature stable inductor circuit;
    wherein said coil includes a plurality of windings of conductive wire having a first diameter and said metallic object includes a length of conductive wire having a second diameter different than said first diameter of said conductive wire of said coil.

13. A temperature stable inductor circuit, comprising in combination:
    a coil located proximate a target to be monitored;
    said coil operatively coupled to and coacting with a circuit means for radiating a magnetic field from the coil into the target for generating eddy currents therein;
    said coil having a resultant temperature dependent series resistance including a proximity effect wire resistance;
    a metallic object disposed within said radiated magnetic field and dimensioned to substantially cancel out said temperature dependent series resistance including said proximity effect wire resistance for affecting said temperature stable inductor circuit;
    wherein said coil includes a plurality of windings of conductive wire having a first diameter and said metallic object includes a length of conductive wire having a second diameter equal to said first diameter of said conductive wire of said coil.

14. A temperature stable proximity probe, comprising in combination:
    a coil;
    electrical circuit means for coacting with said coil for radiating a magnetic field from said coil;
    a metallic object coupled to said coil solely by the magnetic field generated from said coil for modifying a temperature performance of said coil for affecting said temperature stable proximity probe;
    wherein said metallic object modifies said temperature performance of said coil by modifying a resistance versus temperature profile of said coil, and
    wherein said coil includes a plurality of windings of conductive wire having a first diameter and said metallic object includes a length of conductive wire having a second diameter.

15. The temperature stable proximity probe of claim 14 wherein said resistance versus temperature profile of said coil includes a DC wire resistance and a proximity effect wire resistance resulting in a temperature dependent series wire resistance of said coil.

16. The temperature stable proximity probe of claim 15 wherein said metallic object is dimensioned to substantially cancel out said temperature dependent series wire resistance of said coil for affecting said temperature stable proximity probe.

17. The temperature stable proximity probe of claim 16 wherein said first diameter of said conductive wire of said coil is substantially equal to said second diameter of said conductive wire of said metallic object.

18. The temperature stable proximity probe of claim 16 wherein said first diameter of said conductive wire of said coil is different than said second diameter of said conductive wire of said metallic object.

19. A temperature stable proximity probe, comprising in combination:
    a coil producing a varying magnetic field by carrying an alternating current;
    means for compensating for a temperature dependent series resistance profile of said coil including a proximity effect wire resistance of said coil;
    said compensation means coupled to said coil by said magnetic field;
    wherein said coil includes a plurality of windings of conductive wire having a first coefficient of resistance, and
    wherein said compensation means is a metallic object formed from a length of conductive wire having a second coefficient of resistance different than said first coefficient of resistance of said conductive wire of said coil.

20. A temperature stable proximity probe, comprising in combination:
    a coil producing a varying magnetic field by carrying an alternating current;
    means for compensating for a temperature dependent series resistance profile of said coil including a proximity effect wire resistance of said coil;
    said compensation means coupled to said coil by said magnetic field;
    wherein said coil includes a plurality of windings of conductive wire having a first coefficient of resistance, and
    wherein said compensation means is a metallic object formed from a length of conductive wire having a second coefficient of resistance equal to said first coefficient of resistance of said conductive wire of said coil.

21. A temperature stable proximity probe, comprising in combination:
    a coil emanating a varying magnetic field by carrying an alternating current;
    a metallic object disposed in a juxtapositional relationship with said coil;
    a common enclosure housing both said coil and said metallic object;
    said metallic object magnetically coupled to said coil by said varying magnetic field for modifying a temperature performance of said coil;
    wherein said coil includes a plurality of windings of conductive wire having a first diameter and said metallic object includes a length of conductive wire having a second diameter different than said first diameter of said conductive wire of said coil.

22. A temperature stable proximity probe, comprising in combination:
    a coil emanating a varying magnetic field by carrying an alternating current;
    a metallic object disposed in a juxtapositional relationship with said coil;
    a common enclosure housing both said coil and said metallic object;
    said metallic object magnetically coupled to said coil by said varying magnetic field for modifying a temperature performance of said coil;
    wherein said coil includes a plurality of windings of conductive wire having a first diameter and said metallic object includes a length of conductive wire having a second diameter equal to said first diameter of said conductive wire of said coil.

23. A proximity probe operatively coupled to an electronic circuit means for use in monitoring the status of machinery by measuring a gap between said probe and an observed target associated with the machinery, said proximity probe comprising in combination:
    a first coil located proximate the target;
    said first coil operatively coupled to and coacting with the electronic circuit means for radiating a magnetic field from said first coil to the target for generating eddy current therein;

said first coil including a DC wire resistance and a proximity effect wire resistance resulting in a temperature dependent series resistance;

a metallic material disposed adjacent said first coil and solely coupled thereto by the radiated magnetic field;

said metallic material affecting a temperature stable proximity probe by substantially canceling out said temperature dependent series resistance via said magnetic coupling;

wherein said metallic material is a length of conductive wire formed into a second coil.

24. The proximity probe of claim 23 wherein said second coil is a helicoid coil.

25. The proximity probe of claim 23 wherein said coil includes a plurality of windings of conductive wire having a first diameter and said metallic object includes a length of conductive wire having a second diameter different than said first diameter of said conductive wire of said coil.

26. The proximity probe of claim 23 wherein said coil includes a plurality of windings of conductive wire having a first diameter and said metallic object includes a length of conductive wire having a second diameter substantially equal to said first diameter of said conductive wire of said coil.

27. A temperature compensated transformer, comprising in combination:

a first coil winding and a second coil winding wound upon a magnetic core material to form a closed magnetic circuit, said first coil winding being connected to an alternating current source and radiating magnetic energy;

a metallic object disposed within the radiated magnetic energy of said first coil winding;

said metallic object dimensioned to alter a temperature profile of said first coil winding by magnetically coupling with the radiated magnetic energy of said first coil winding for providing said temperature compensated transformer;

wherein said metallic object includes a winding of conductive wire.

28. The temperature compensated transformer of claim 27 wherein said winding of conductive wire of said metallic object is wound upon said magnetic core material.

29. The temperature compensated transformer of claim 28 wherein said winding of conductive wire of said metallic object wound upon said magnetic core material is left open defining an open circuit coil wound upon said magnetic core material for providing temperature compensation of said transformer.

30. A temperature compensated transformer, comprising in combination:

a first coil winding and a second coil winding wound upon a magnetic core material to form a closed magnetic circuit, said first coil winding being connected to an alternating current source and radiating magnetic energy;

a metallic object disposed within the radiated magnetic energy of said first coil winding;

said metallic object dimensioned to alter a temperature profile of said first coil winding by magnetically coupling with the radiated magnetic energy of said first coil winding for providing said temperature compensated transformer;

a load connected to said second coil winding resulting in said second coil winding radiating magnetic energy.

31. The temperature compensated transformer of claim 30 wherein said metallic object is disposed within the radiated magnetic energy of said first coil winding and said second coil winding for altering the temperature profile of said first coil winding and a temperature profile of said second coil winding for providing said temperature compensated transformer.

* * * * *